Aug. 28, 1956  R. O. STROMBERG  2,760,367
ENGINE COOLING SYSTEM TESTING DEVICE
Filed May 14, 1954  2 Sheets-Sheet 1
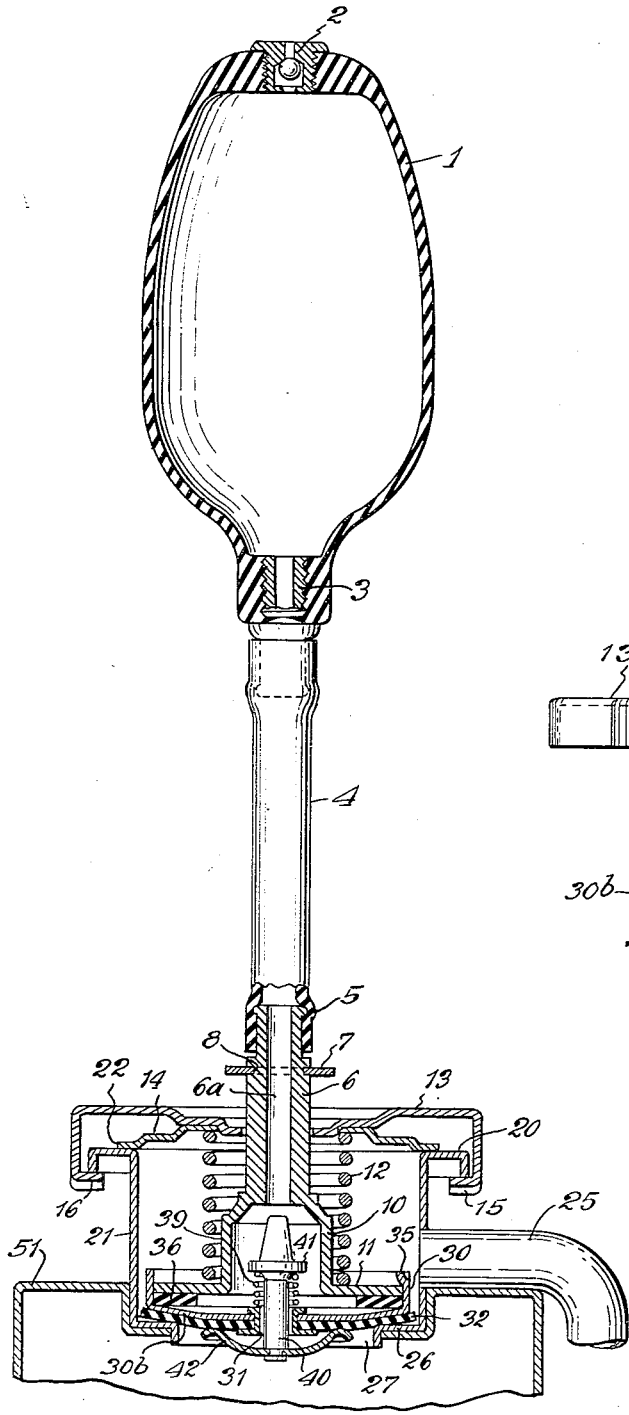
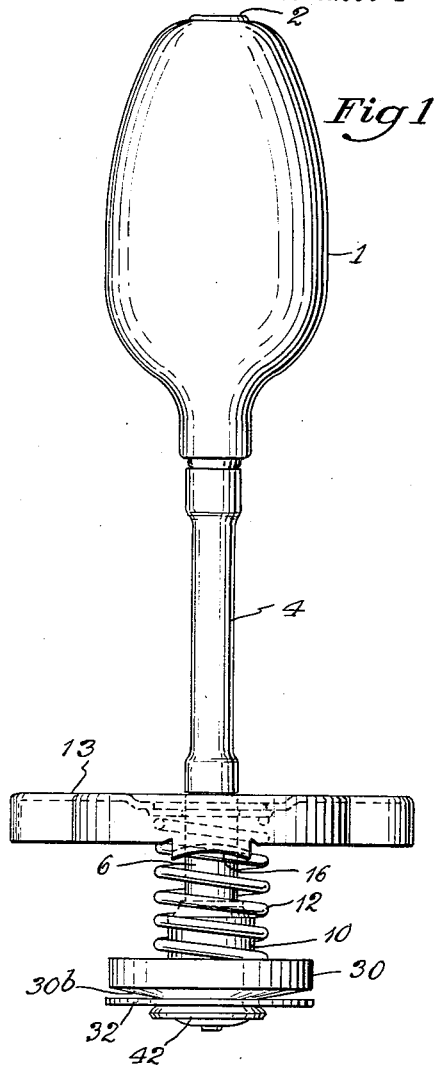
Inventor
Ralph O. Stromberg
by Parker & Carter
Attorneys Aug. 28, 1956     R. O. STROMBERG     2,760,367
ENGINE COOLING SYSTEM TESTING DEVICE
Filed May 14, 1954     2 Sheets-Sheet 2
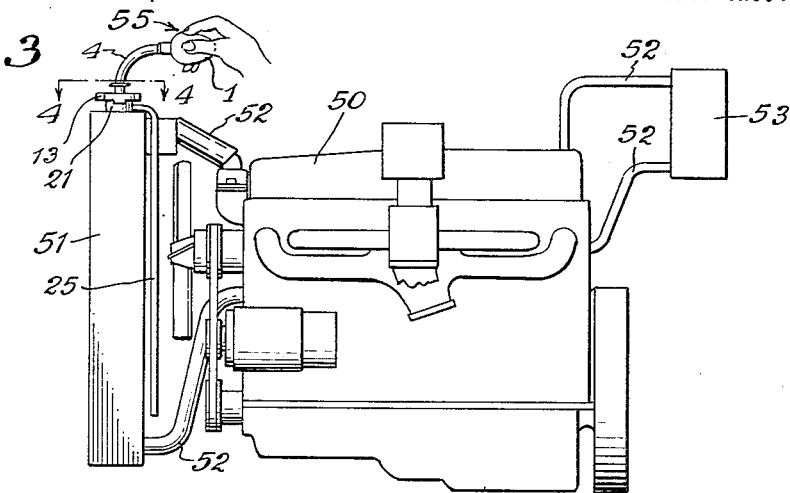
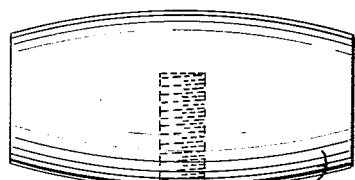
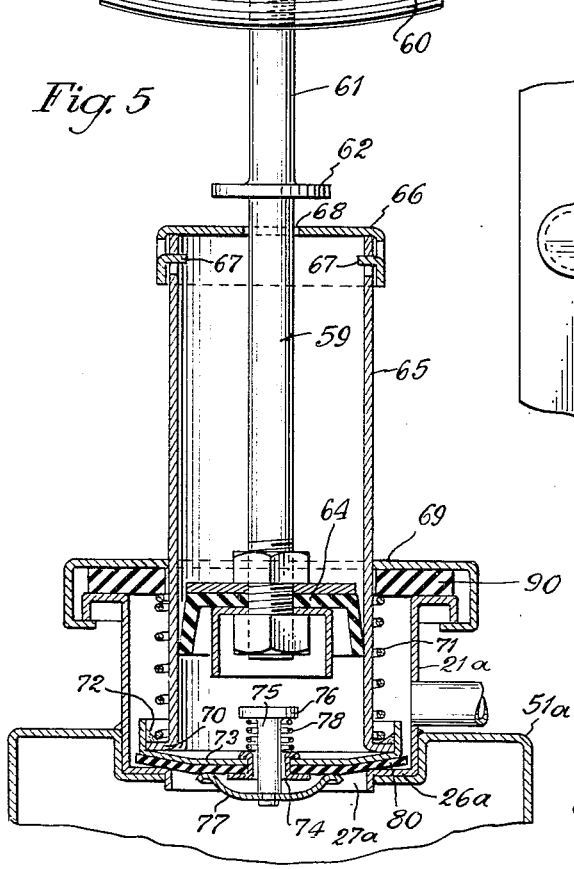
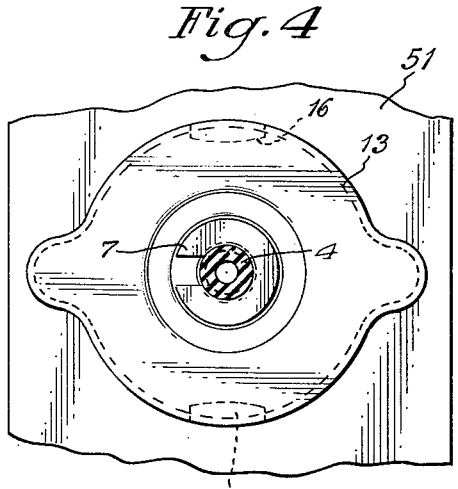
Inventor
Ralph O. Stromberg
by Parker & Carter
Attorneys United States Patent Office 2,760,367
Patented Aug. 28, 1956

2,760,367

ENGINE COOLING SYSTEM TESTING DEVICE

Ralph O. Stromberg, Chicago, Ill.

Application May 14, 1954, Serial No. 429,805

2 Claims. (Cl. 73—40)

My invention is directed generally to means for detecting leaks and has as one purpose the provision of improved means capable of use in applying pressure to a cooling system in order to make apparent a leak therein.

Another purpose of my invention is the provision of improved means for applying and maintaining pressure on the cooling medium of an internal combustion engine.

Another purpose is to provide such improved means which shall be simple in construction and which shall be easily and simply employed with an internal combustion engine.

Another purpose is to provide such improved means capable of use with an internal combustion engine without modification to any of the mechanisms associated with such engine.

The cooling systems of internal combustion engines ordinarily employ a circuit through which the cooling medium travels throught a radiator, the engine block and head and accessory equipment. Pumps may be provided to insure the passage of such coolant through the system. When the engine is running and a leak occurs, it is often difficult to detect the exact point of leakage. When the engine is stopped, and the engine has cooled, the system is not under pressure. Under these conditions, a leak will often not be apparent. It is accordingly one purpose of my invention to provide a simple improved means of creating pressure on the cooling system when the engine is stopped.

It has been suggested that the filler cap on the radiators associated with internal combustion engines be replaced with a special type of cap; that the vehicle driven by the engine be raised; that the end of the radiator overflow pipe be located and that a hose be attached to the overflow pipe to supply pressure therethrough to the cooling system. This suggestion has proved cumbersome, time-consuming, and unsatisfactory. In addition, the overflow tube is often bent and greasy, making difficult the attachment of a pressure hose to it. Since such overflow pipes are themselves subject to leakage, moreover, it is often impossible to build up pressure on the system itself, since the overflow pipe normally enters the system above the valve which supports the normal working pressure in the system.

Other purposes will appear from time to time in the course of the specification and claims.

I illustrate my invention more or less diagrammatically in the following drawings, wherein:

Figure 1 is a side elevation;

Figure 2 is a side elevation in partial cross section and on an enlarged scale, illustrating the device of Figure 1 in association with the filler neck of an internal combustion engine radiator;

Figure 3 is a side view of an internal combustion engine and cooling system on a reduced scale, illustrating the employment with such system of the device illustrated in Figures 1 and 2;

Figure 4 is a view taken on a line 4—4 of Figure 3;

Figure 5 is a side view in partial cross section of a variant form of my invention.

Like parts are indicated by like numerals throughout the specification and drawings.

Referring now to the drawings, and particularly to Figures 1 and 2, the numeral 1 indicates a pressure bulb which may be formed of a material having the qualities of rubber. The bulb 1 is an air pump, having at one end the ball check valve, generally indicated by the numeral 2. The bulb 1 has at its opposite end a fitting or nipple, generally illustrated at 3, for connecting the bulb pump 1 to an end of a hose member 4. The opposite end of the hose 4 is connected as at 5 to a tubular member 6. Secured to the member 6, adjacent the hose end 5, is an abutment or stop means 7, which may be a split ring slipped into a groove 8 in the tubular member or pipe 6. The member 6 may have secured thereto or integral therewith a hollow, enlarged end portion 10 which may carry the outwardly extending annular flange portion 11. Surrounding the pipe 6 and its enlarged portion 10 is a spring member 12. The spring 12 abuts the upper face, as the parts are shown in the drawings, of the flange 11, and at its opposite end, abuts a filler cap member 13. The filler cap member 13 may have a generally annular yieldable plate 14 secured to an underface thereof, and the spring 12 may have its upper end abutting the member 14, as shown in Figure 2. The cap 13 is slidably mounted on the member 6 and may have inwardly extending, oppositely opposed fingers 15, 16 positioned to underlie portions of an overhanging flange 20 on a filler neck 21, ordinarily found on the radiators of internal combustion engine cooling systems. The outer, peripheral portion of the member 14 may seat upon the outwardly extending flange 20 of the filler neck 21, as illustrated at 22, when the cap 13 is in position on the neck 21.

25 is an overflow tube connected to the neck 21 generally intermediate the upper and lower ends thereof. The neck 21 includes a bottom wall portion 26 having a generally centrally located aperture 27 therein.

Carried by the flange 11 is a valve support member 30 which is centrally apertured as at 31. The member 30 has secured thereto the sealing member 32 which may be formed of rubber and which is of sufficient annular extension to seat upon the bottom wall 26 about the aperture 27 when the device is in operative position. The member 30 is secured to and about the flange 11, as indicated generally at 35. 36 is a washer between the lower base of the flange 11 and the lower plate portion 30b of the member 30.

Movably supported in the aperture 31, as by the spring 39, is a valve member generally indicated at 40. The valve 40 has an annular upper flange 41 against the bottom face of which the spring 39 abuts to urge the valve upwardly. The valve 40 carries at its outwardly extending end a valve plate member 42. As the spring 39 urges the valve upwardly, the valve carries the plate 42 upwardly against a generally central portion of the seal 32 which, as indicated above, may be formed of rubber or similar material. When the annular valve plate 42 is thus brought against the member 32, it seals the aperture 31. As will be seen in Figure 2, a passage for air is created through the check valve 2 and pump 1, thence through the hose 4 and passage 6a in pipe 6—10, and finally through the aperture 31, which is in general alignment with the passage 6a, and thence into the radiator of the cooling system. Thus the valve plate 42 is effective to seal this passage. When the pump 1 is operated, however, air under pressure passes through the aperture 31 and against the upper face of the valve plate 42 to move it downwardly, thus admitting pressure to the radiator and cooling system.

Upon an increase in pressure in the system above a desired amount, i. e. sufficient to overcome the predetermined setting of the resistance in spring 12, the entire structure, comprising elements 1 to 11 and 30 to 42 is forced upwardly, the seal 32 is lifted off its seat on wall 26 and the excess pressure exhausts through the pipe 25 or between the spring plate 14 and flange 20.

In Figure 3, an internal combustion engine of an automobile is generally indicated by the numeral 50. A cooling system radiator is indicated by the numeral 51. 52 indicates the cooling system piping and 53 indicates a cooling system accessory, such as a compartment heater, for example. The manual operation of the device shown in Figures 1 and 2 is illustrated at 55 in Figure 3. While an automobile system is illustrated, it will be noted that my invention is applicable to any engine liquid cooling system.

In the variant form of my invention illustrated in Figure 5 I provide a hand pump generally indicated at 59 having a handle portion 60 which is secured to one end of a pump rod 61 on which a radially extending abutment member 62 may be secured intermediate its ends. The rod 61 may have secured to its opposite end an air pump diaphragm, as shown generally at 64. The rod 61 and diaphragm 64 may be movably positioned in a cylindrical housing 65. The housing 65 may have at its upper end a closure cap 66 which may be secured thereto by the inwardly extending fingers 67. The cap 66 has a generally centrally located aperture 68 through which the rod extends. Since the aperture 68 is of a slightly larger diameter than the rod 61, a passage for air is thus provided.

A filler cap member 69 is slidably mounted on and about the housing 65. The housing 65 has surrounding its inner end an outwardly extending annular flange 70. A spring 71 surrounds the housing 65 and abuts the flange 70 and cap 69. The housing 65 has secured thereto, as at 72, a bottom closure or valve-supporting plate 73 which is generally centrally apertured as at 74. Slidably mounted in the aperture 74 and having a diameter less than the aperture 74 is a valve stem 75. An upper and outwardly extending annular flange 76 and a lower outwardly extending annular valve plate 77 are secured to the opposite ends of the stem 75 above and below, respectively, the plate or bottom wall portion 73 in the pump 59. A spring 78 surrounds the stem 75 above the aperture 74 and abuts the flange 76 and bottom wall 73. 80 is a rubber-like annular sealing member of sufficient diameter to seat upon the bottom wall 26a of the filler neck 21a. As illustrated in Figure 5, the valve plate 77 is urged upwardly against the sealing member 80 within the aperture 27a in the bottom wall 26a.

Illustrated in Figure 5 is a washer member 90 which may be formed of a material of the qualities of rubber. The spring 71 may be arranged to abut the member 90, as shown in Figure 5, and to create upward pressure against the cap 69 thereby.

In response to an oversupply of pressure in the system sufficient to overcome the spring 71, the housing 65 moves upwardly against the action of the spring 71 and the seal 80 is unseated to allow the excess pressure to escape through the usual overflow pipe (not shown). Thus, as in Figures 1-4, my pump and valved outlet means itself acts as a relief valve in the event an excessive pressure is supplied by the operator. 51a is a portion of the radiator with which the filler neck 21a is associated.

It will be observed that the valve means 40 of Figure 2 and 75 of Figure 5 are essentially identical and that they function in the same manner. The detailed description of the valve 75 shown in Figure 5 should therefore be considered applicable to the valve 40 shown in Figure 2.

It will be realized that whereas I have described and illustrated a practical and operative device, nevertheless, many changes may be made in the size, shape, number and disposition of parts without departing from the spirit of my invention. I, therefore, wish my description and drawings to be taken as in a broad sense illustrative or diagrammatic, rather than as limiting me to my precise showing.

The use and operation of my device are as follows:

I provide a filler cap and valve means which closes a filler neck, such as the neck 21, below an overflow pipe, such as the pipe 25. With the filler cap means is supplied a pump which may be the bulb pump of Figures 1-4 or the hand pump 59 of Figure 5. When a cooling system is suspected or known to have leaks therein, the operator fills the cooling system right up to a point immediately below the filler neck 21. The air pump is then operated to supply pressure something above the ordinary working pressure of the cooling fluid, the average of which may be considered in the order of approximately seven pounds. Only a relatively few operations of the air pump are necessary, since very little air is being compressed.

With the cooling system thus placed under pressure, it may be inspected to determine and locate the leak therein. The cooling liquid will escape through the leak and will either squirt therefrom in a stream or will wet the area around the leak. The one-way or check-valve 40 or 75 is effective to maintain pressure in the system after it has been applied through the valve from the pump 1 or 59. Cooling systems operating normally at, say, seven pounds pressure have a safety factor of, say, an additional three pounds. With my invention, the spring 12 or 71 may be tensioned to release at, say, ten pounds in order to provide a proper test of the ability of the system to operate without leaks at ten pounds pressure.

If considered necessary, a pressure gauge may be associated with my device to determine the exact amount of pressure placed on the system. Since the pump and all of its elements except the cap are moved upwardly to function as a relief valve upon increase of pressure in the system above the desired amount, however, the need for a gauge is, in most cases, obviated. In any event, I provide a simple, unitary device which may be quickly, easily and simply applied to a cooling system of an internal combustion engine, without changing it or raising the vehicle to which it is attached, and when the engine is in a condition to be worked upon, and the device is effective to enable the operator to determine with certainty the location of leaks in the cooling system.

In the event that a leak is suspected in the gasket between the cylinder block and cylinder head of an engine, my device may be expedient in determining the presence or absence of such a leak. The operator need only operate the pump to bring the pressure in the system to just under the point at which the springs 12, 71 will yield. With the cooling system thus under steady retained pressure, the fan belt of the engine or other cooling fluid pump driving means is connected and the engine is turned over, thus creating a compression or pressure in the engine cylinders substantially greater than that in the cooling system. If a leak is present, air will escape through or by the gasket and will enter the cooling system, thus increasing the pressure therein to the point at which the spring 12 or 71 will yield. The operator determines this by observing the pump portion extending above the filler cap 13 or 69, i. e., if it rises and falls due to momentary increases in the cooling system pressure, it is clear that the head gasket is leaking pressure into the cooling system. If the upper pump portion described remains stationary, it establishes the absence of a leak sufficient to permit air to escape from the system into the cooling system.

I claim:

1. For use with an automobile radiator filler neck, a cap adapted to rest on and removably interlock with the outboard end of said neck, a pressure conduit slidably mounted in and carried by said cap, said conduit extending through said cap, air pressure producing means secured to and carried by said conduit and effective to produce air pressure in said conduit and to direct said air under pressure through said conduit, a flexible sealing disc carried at one end of said pressure conduit and adapted to penetrate the neck, yielding means surrounding said pressure conduit and positioned between said sealing disc and said cap to urge said sealing disc to rest near and close the inboard end of said neck, said sealing disc being apertured in register and communication with said pressure conduit, a valve in said disc, additional yielding means biasing said valve to close said aperture in said sealing disc against a predetermined amount of air pressure from the conduit, said sealing disc being yieldingly biased to seat near and close the inboard end of said neck.

2. For use with an automobile radiator filler neck, a cap adapted to rest on and removably interlock with the outboard end of said neck, a pressure conduit slidably mounted in and carried by said cap, said pressure conduit extending through said cap, air pressure producing means secured to and carried by said pressure conduit and effective to produce air pressure in said pressure conduit and to direct said air under pressure through said pressure conduit, a flexible sealing disc carried at one end of said pressure conduit and adapted to penetrate the neck, yielding means surrounding said pressure conduit and positioned between said sealing disc and said cap to urge said sealing disc to seat near and close the inboard end of said neck, said sealing disc being apertured in register and communication with said pressure conduit, a valve in said disc, additional yielding means biasing said valve to close said aperture in said sealing disc against a predetermined amount of air pressure from the pressure conduit, said sealing disc being yieldingly biased to seat near and close the inboard end of said neck, said air producing means comprising a closure connected to the outer end of said pressure conduit, a diaphragm slidably mounted in said pressure conduit, a rod connected to said diaphragm and extending slidably through and outwardly beyond said closure and manually operable handle means connected to the outer end of said rod.

References Cited in the file of this patent
UNITED STATES PATENTS

| | | |
|---|---|---|
| 1,004,986 | Burkett | Oct. 3, 1911 |
| 1,335,073 | Osborn | Mar. 30, 1920 |
| 1,337,132 | Harpst | Apr. 13, 1920 |
| 1,503,411 | Zimmerman | July 29, 1924 |
| 1,613,217 | Armstrong | Jan. 4, 1927 |
| 2,007,100 | Varese | July 2, 1935 |
| 2,225,964 | Bailey | Dec. 24, 1940 |
| 2,446,219 | Eaton | Aug. 3, 1948 |
| 2,465,895 | March | Mar. 29, 1949 |
| 2,596,070 | Friend et al. | May 6, 1952 |